(12) United States Patent
Bancroft

(10) Patent No.: US 11,168,816 B2
(45) Date of Patent: Nov. 9, 2021

(54) COUPLING HAVING SEAL WITH RETRACTING CENTER LEG

(71) Applicant: Victaulic Company, Easton, PA (US)

(72) Inventor: Philip Wayne Bancroft, Belvidere, NJ (US)

(73) Assignee: Victaulic Company, Easton, PA (US)

( * ) Notice: Subject to any disclaimer, the term of this patent is extended or adjusted under 35 U.S.C. 154(b) by 224 days.

(21) Appl. No.: 15/994,299

(22) Filed: May 31, 2018

(65) Prior Publication Data

US 2018/0347730 A1 Dec. 6, 2018

Related U.S. Application Data

(60) Provisional application No. 62/514,229, filed on Jun. 2, 2017.

(51) Int. Cl.
*F16L 17/04* (2006.01)

(52) U.S. Cl.
CPC .................... *F16L 17/04* (2013.01)

(58) Field of Classification Search
CPC .......... F16J 15/02; F16L 17/04; F16L 21/005; F16L 21/06; Y10T 29/4994; Y10T 29/49938; Y10T 29/49936
See application file for complete search history.

(56) References Cited

U.S. PATENT DOCUMENTS

| | | | |
|---|---|---|---|
| 1,541,601 A | 6/1925 | Tribe | |
| 1,805,666 A | 5/1931 | Hukill | |
| 1,808,262 A | 6/1931 | Hele-Shaw | |
| 1,821,867 A | 9/1931 | Wilson | |
| 1,867,891 A | 7/1932 | Reynolds | |
| 1,994,361 A | 3/1935 | Johnson | |
| 2,028,182 A | 1/1936 | Barnickol, Jr. | |
| 2,507,261 A | 5/1950 | Mercier | |
| 2,687,906 A | 8/1954 | Schnell | |
| 3,004,780 A | 10/1961 | Main | |
| 3,062,565 A | 11/1962 | Word, Jr. | |
| 3,134,612 A | 5/1964 | Glasgow | |
| 3,403,931 A | 10/1968 | Crain et al. | |
| 4,189,172 A | 2/1980 | Perrin | |
| 4,350,350 A | 9/1982 | Blakeley | |
| 4,480,861 A | 11/1984 | Cann, Jr. | |
| 4,629,217 A | 12/1986 | Straub | |

(Continued)

FOREIGN PATENT DOCUMENTS

| | | |
|---|---|---|
| CN | 102656397 | 9/2012 |
| CN | 103363207 | 10/2013 |

(Continued)

*Primary Examiner* — Lee A Holly
(74) *Attorney, Agent, or Firm* — Ballard Spahr LLP

(57) ABSTRACT

A coupling for joining pipe elements has segments surrounding a central space with cusps which engage lobes of a seal to maintain the segments in spaced apart relation in a preassembled state. While the coupling is in the preassembled state the pipe elements may be inserted into the central space without disassembling the coupling, and portions of the seal adjacent to attachment members on the segments seat within a channel defined by the segments between the cusps. When the seal is compressed between the segments and the pipe elements to form a joint the seal deforms so as to withdraw a center leg of the seal from the flow path defined within the pipe elements.

2 Claims, 6 Drawing Sheets

(56) References Cited

U.S. PATENT DOCUMENTS

| | | |
|---|---|---|
| 4,726,611 A | 2/1988 | Sauer |
| 4,779,903 A | 10/1988 | Maier et al. |
| 5,058,931 A | 10/1991 | Bowsher |
| 5,476,292 A | 12/1995 | Harper |
| 7,086,131 B2 | 8/2006 | Gibb et al. |
| 7,341,287 B2 | 3/2008 | Gibb et al. |
| 7,472,911 B2 | 1/2009 | Sun et al. |
| 8,038,176 B2 | 10/2011 | Bowman et al. |
| 8,069,547 B2 | 12/2011 | Gibb et al. |
| 8,282,136 B2 | 10/2012 | Vandal et al. |
| 8,424,918 B2 | 4/2013 | Gibb et al. |
| 8,556,302 B2 | 10/2013 | Dole |
| 8,628,122 B2 | 1/2014 | Kozal |
| 8,819,914 B2 | 9/2014 | Porter et al. |
| 9,726,310 B2 | 8/2017 | Gibb et al. |
| 9,958,095 B2 | 5/2018 | Blease et al. |
| 2003/0062718 A1 | 4/2003 | Radzik |
| 2005/0253029 A1 | 11/2005 | Gibb et al. |
| 2005/0253380 A1 | 11/2005 | Gibb |
| 2008/0129048 A1 | 6/2008 | Nagle |
| 2009/0146417 A1 | 6/2009 | Lippka et al. |
| 2010/0001521 A1 | 1/2010 | Vandall et al. |
| 2013/0185919 A1 | 7/2013 | Beagen, Jr. |
| 2013/0257045 A1 | 10/2013 | Mikami |
| 2014/0246852 A1* | 9/2014 | Gibb ............... F16L 21/005 285/337 |
| 2014/0327238 A1 | 11/2014 | Bowman |
| 2016/0076681 A1* | 3/2016 | Blease ............ F16L 25/009 285/91 |
| 2016/0327192 A1 | 11/2016 | Lippka |
| 2018/0163905 A1 | 6/2018 | Ohnemus et al. |
| 2018/0163906 A1 | 6/2018 | Ohnemus et al. |

FOREIGN PATENT DOCUMENTS

| | | |
|---|---|---|
| EP | 0396952 | 11/1990 |
| GB | 2121133 | 12/1983 |
| WO | 2011056512 | 5/2011 |

* cited by examiner

COUPLING HAVING SEAL WITH RETRACTING CENTER LEG

CROSS REFERENCE TO RELATED APPLICATIONS

This application is based upon and claims benefit of priority to U.S. Provisional Application No. 62/514,229, filed Jun. 2, 2017, which application is hereby incorporated by reference herein.

FIELD OF THE INVENTION

This invention relates to mechanical couplings and seals for joining pipe elements.

BACKGROUND

One form of mechanical pipe coupling comprises segments attached to one another end to end surrounding a central space. A seal, for example a ring seal formed of an elastomeric material, is captured between the segments. The segments are attached end to end using adjustable attachment members, for example, lugs positioned at each end of each segment which receive fasteners joining the ends. Examples of such couplings are disclosed in U.S. Pat. No. 7,712,796. The segments surround and engage the ends of pipe elements to form a mechanical joint, and the seal is compressed between the segments and the pipe elements to ensure fluid tightness.

It is advantageous to support the segments in spaced apart relation sufficient to permit pipe elements to be inserted into the central space defined by the segments while the segments are held together by the fasteners. This "preassembled state" of the coupling promotes rapid formation of the joint as the coupling need not be disassembled and reassembled when connecting the pipe elements. Prior art couplings support the segments in the preassembled state on the outer circumference of the ring seal. However, there are opportunities to achieve a more compact coupling design where the segments are still supported on the seal in spaced relation sufficient to permit pipe elements to be inserted into the central space.

SUMMARY

One aspect of the invention concerns a coupling for joining pipe elements in end to end relation. In one example embodiment, the coupling comprises first and second segments attached to one another end to end and surrounding a central space. Each of the segments has a channel extending circumferentially around and facing the central space. Each of the channels is defined by first and second shoulders located on opposite sides of the segments and a back surface extending between the shoulders. Each shoulder comprises a first surface facing the central space and a second surface oriented at an angle with respect to the first surface. The first and second surfaces of the first shoulder meet at a first cusp, the first and second surfaces of the second shoulder meet at a second cusp. A seal is positioned within the central space. The seal comprises a ring having first and second lobes positioned on opposite sides thereof. First and second attachment members are positioned at opposite ends of each of the segments attaching the segments to one another. The attachment members are adjustably tightenable for drawing the segments toward one another. Contact between the first cusp and the first lobe and the second cusp and the second lobe between the first and second attachment members on each the segment maintains the first and second segments in spaced relation sufficient to permit insertion of the pipe elements into the central space.

In a specific example the first and second lobes contact the second surfaces of the first and second shoulders adjacent to the first and second attachment members when the first and second segments are in the spaced relation.

By way of example the seal further comprises a center leg positioned between the first and second lobes. The center leg projects toward the central space. When the seal is seated within the channel such that at least a portion of the first lobe contacts the second surface of the first shoulder and at least a portion of the second lobe contacts the second surface of the second shoulder the seal is deformed such that the center leg is retracted toward the back surface.

An example embodiment may further comprise first and second arcuate projections arranged on opposite sides of each of the first and second segments. The first projections extend from the first shoulders on the first and second segments, the second projections extend from the second shoulders of the first and second segments in this example. Further by way of example, the first arcuate projections may have a greater radius of curvature than the second arcuate projections.

Another example coupling for joining pipe elements in end to end relation comprises first and second segments attached to one another end to end and surrounding a central space. Each of the segments has a channel extending circumferentially around and facing the central space. Each of the channels is defined by first and second shoulders located on opposite sides of the segments and a back surface extending between the shoulders. Each shoulder comprises a first surface facing the central space and a second surface oriented at an angle with respect to the first surface. The first and second surfaces of the first shoulder meet at a first cusp, the first and second surfaces of the second shoulder meet at a second cusp. A seal is positioned within the central space. The seal comprises a ring having first and second lobes positioned on opposite sides thereof and a center leg between the first and second lobes. The center leg projects toward the central space. First and second attachment members are positioned at opposite ends of each of the segments attaching the segments to one another. The attachment members are adjustably tightenable for drawing the segments toward one another and seating the seal within the channel, thereby deforming the seal. When the seal is seated within the channel, at least a portion of the first and second lobes are in contact with the second surfaces of the first and second shoulders so as to deform the seal. The center leg is retracted toward the back surface upon deformation of the seal.

Further by way of example, contact between the first cusp and the first lobe and the second cusp and the second lobe between the first and second attachment members on each the segment maintains the first and second segments in spaced relation sufficient to permit insertion of the pipe elements into the central space. While in the preassembled state, the first and second lobes may contact the second surfaces of the first and second shoulders adjacent to the first and second attachment members when the segments are in the spaced relation.

In another example, first and second arcuate projections may be arranged on opposite sides of each if the first and second segments. The first projections extend from the first shoulders on the first and second segments, the second projections extend from the second shoulders of the first and second segments. Also by way of example, the first arcuate projections may have a greater radius of curvature than the second arcuate projections.

The invention also encompasses, in combination, a pair of pipe elements and a coupling for joining the pipe elements in end to end relation. By way of example the coupling comprises first and second segments attached to one another end to end and surrounding a central space. Each of the segments has a channel extending circumferentially around and facing the central space. Each of the channels is defined by first and second shoulders located on opposite sides of the segments and a back surface extending between the shoulders. Each shoulder comprises a first surface facing the central space and a second surface oriented at an angle with respect to the first surface. The first and second surfaces of the first shoulder meet at a first cusp, the first and second surfaces of the second shoulder meet at a second cusp. A seal is positioned within the central space. The seal comprises a ring having first and second lobes positioned on opposite sides thereof. First and second attachment members are positioned at opposite ends of each of the segments attaching the segments to one another. The attachment members are adjustably tightenable for drawing the segments toward one another. Contact between the first cusp and the first lobe and the second cusp and the second lobe between the first and second attachment members on each the segment maintain the first and second segments in spaced relation sufficient to permit insertion of the pipe elements into the central space.

In an example embodiment the first and second lobes contact the second surfaces of the first and second shoulders adjacent to the first and second attachment members when the first and second segments are in the spaced relation.

The invention also includes, in combination, a pair of pipe elements and a coupling for joining the pipe elements in end to end relation. In an example embodiment the coupling comprises first and second segments attached to one another end to end and surrounding a central space. Each of the segments has a channel extending circumferentially around and facing the central space. Each of the channels is defined by first and second shoulders located on opposite sides of the segments and a back surface extending between the shoulders. Each shoulder comprises a first surface facing the central space and a second surface oriented at an angle with respect to the first surface. The first and second surfaces of the first shoulder meet at a first cusp, the first and second surfaces of the second shoulder meet at a second cusp. A seal is positioned within the central space. The seal comprises a ring having first and second lobes positioned on opposite sides thereof and a center leg between the first and second lobes. The center leg projects toward the central space. First and second attachment members are positioned at opposite ends of each of the segments attaching the segments to one another. The attachment members are adjustably tightenable for drawing the segments toward one another and seating the seal within the channel, thereby deforming the seal. When the seal is seated within the channel, at least a portion of the first and second lobes are in contact with the second surfaces of the first and second shoulders so as to deform the seal, the center leg being retracted toward the back surface upon deformation of the seal. By way of example, contact between the first cusp and the first lobe and the second cusp and the second lobe between the first and second attachment members on each the segment maintains the first and second segments in spaced relation sufficient to permit insertion of the pipe elements into the central space.

The invention also encompasses a method of connecting first and second pipe elements to one another using a coupling comprising first and second segments attached to one another end to end surrounding a central space. A seal is positioned between the segments, the seal comprising first and second lobes on opposite sides thereof and a center leg positioned between the lobes, the center leg projecting toward the central space. IN an example embodiment the method comprises:

supporting the segments in spaced apart relation on the seal by contacting first and second points on the first lobe with first cusps of first shoulders of the first and second segments, the first and second points on the first lobe being between ends of the first and second segments, and by contacting first and second points on the second lobe with second cusps of second shoulders of the first and second segments, the first and second points on the second lobe being between ends of the first and second segments;

inserting the pipe elements into the central space, the center leg being between the pipe elements;

drawing the first and second segments toward one another and thereby deforming the seal such that the center leg is retracted in a direction away from the central space.

DETAILED DESCRIPTION

Figure 1:
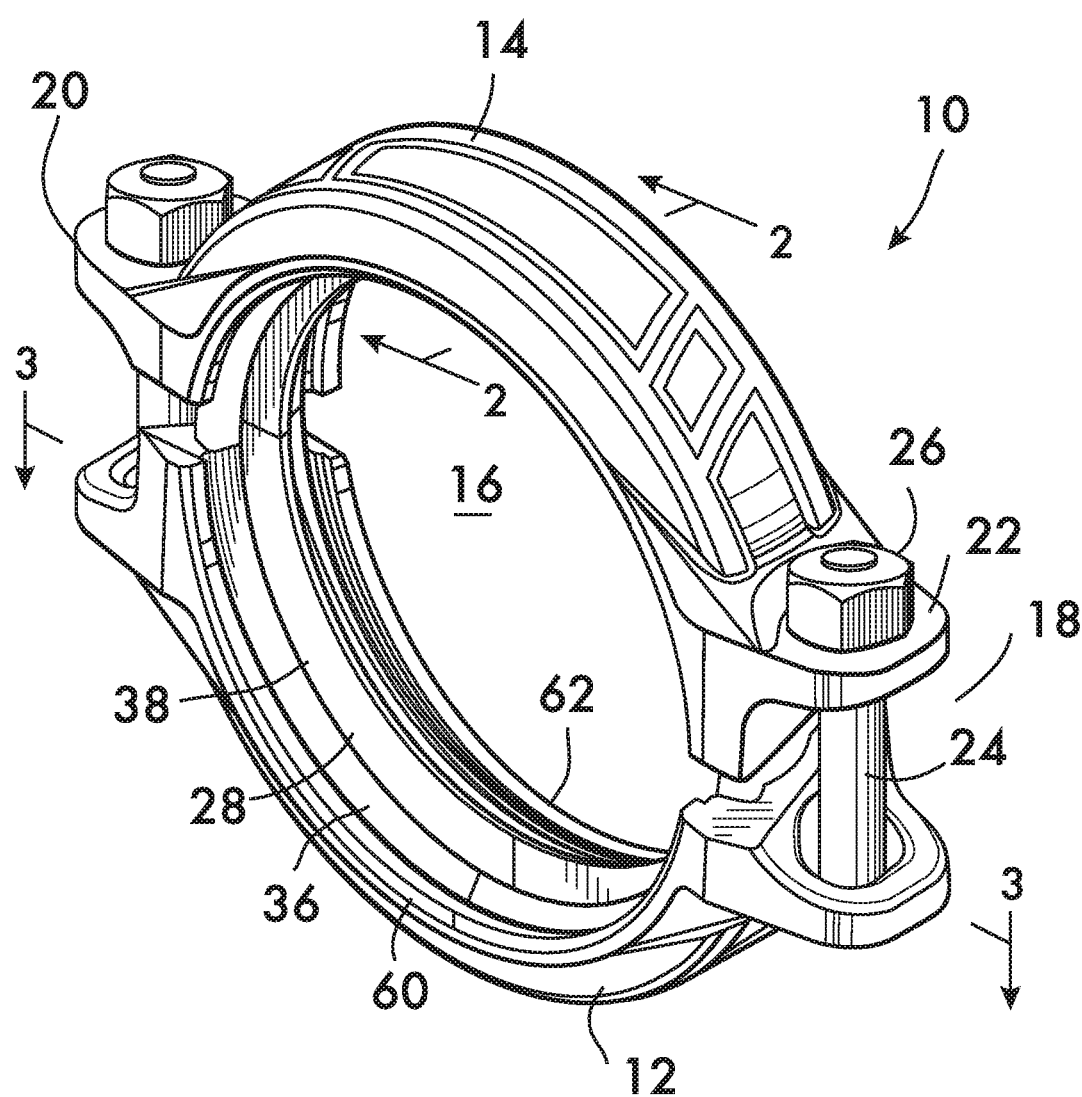
FIG. 1 is an isometric view of an example coupling according to the invention shown in a preassembled state.
Figure 2:
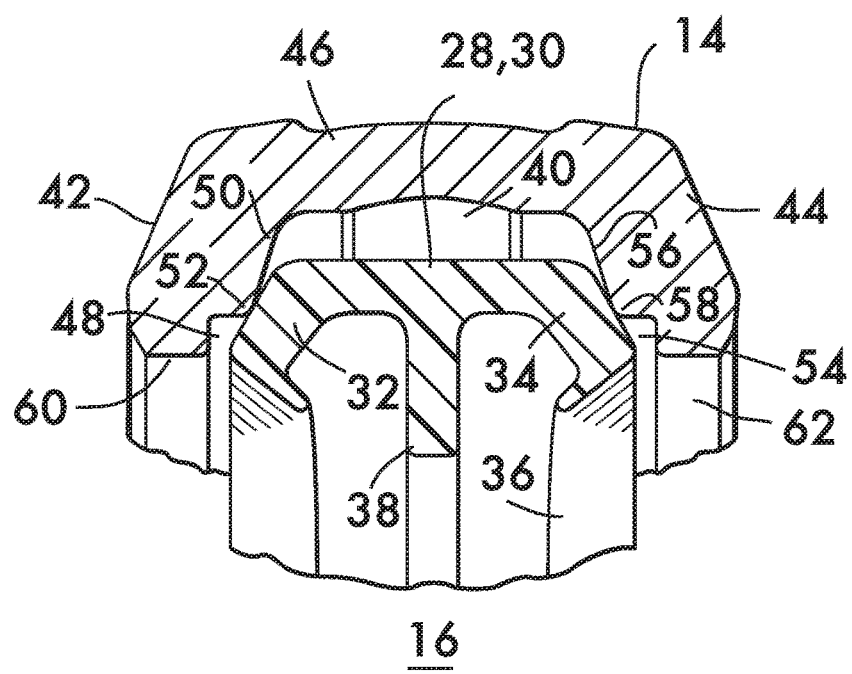
FIG. 2 is a sectional view taken at line 2-2 of FIG. 1.

FIG. 1 shows an example embodiment of a coupling 10 according to the invention. Example coupling 10 comprises first and second segments 12 and 14 attached to one another end to end and surrounding a central space 16. In this example attachment of the segments 12 and 14 to one another is effected by first and second adjustably tightenable attachment members 18 which comprise lugs 20, 22 positioned at opposite ends of each segment 12, 14. Lugs 20, 22 receive fasteners, such as bolts 24 and nuts 26 which draw the segments 12 and 14 toward one another when tightened. A seal 28 is positioned between the segments 12 and 14. As shown in FIG. 2, seal 28 comprises a ring 30 having first and second lobes 32 and 34 positioned on opposite sides of the ring. Lobes 32 and 34 extend circumferentially around the ring 30. A circumferentially extending sealing surface 36 is positioned at the end of each lobe 32, 34. Sealing surfaces 36 face the central space 16 and engage pipe elements to effect a fluid tight joint as explained below. A center leg 38 extends from ring 30 toward the central space 16. The center leg 38 extends circumferentially around the ring 30 and acts as a pipe stop to ensure that pipe elements are properly seated within the coupling as described below.

As shown in FIG. 2, each segment 12 and 14 (14 shown) comprises a channel 40 extending circumferentially around each segment, the channels 40 facing the central space 16. Each channel 40 is defined by first and second shoulders 42 and 44 and a back surface 46. Shoulders 42 and 44 are located on opposite sides of segments 12 and 14 and the back surface 46 extends between the shoulders. First shoulder 42 comprises a first surface 48 which faces the central space 16, and a second surface 50 oriented at an angle with respect to the first surface 48. The first and second surfaces 48, 50 meet at a first cusp 52. Second shoulder 44 comprises a first surface 54 which faces the central space 16, and a second surface 56 oriented at an angle with respect to the first surface 54. The first and second surfaces 54, 56 meet at a second cusp 58. In this example embodiment the first and second cusps 52, 58 are rounded, but other shapes are feasible. In this example coupling the segments 12 and 14 also comprise arcuate projections 60 and 62 arranged on opposite sides of each segment 12 and 14. The arcuate projections, also called "keys" engage circumferential grooves in the pipe elements to provide mechanical engagement as described below.

Figure 3:
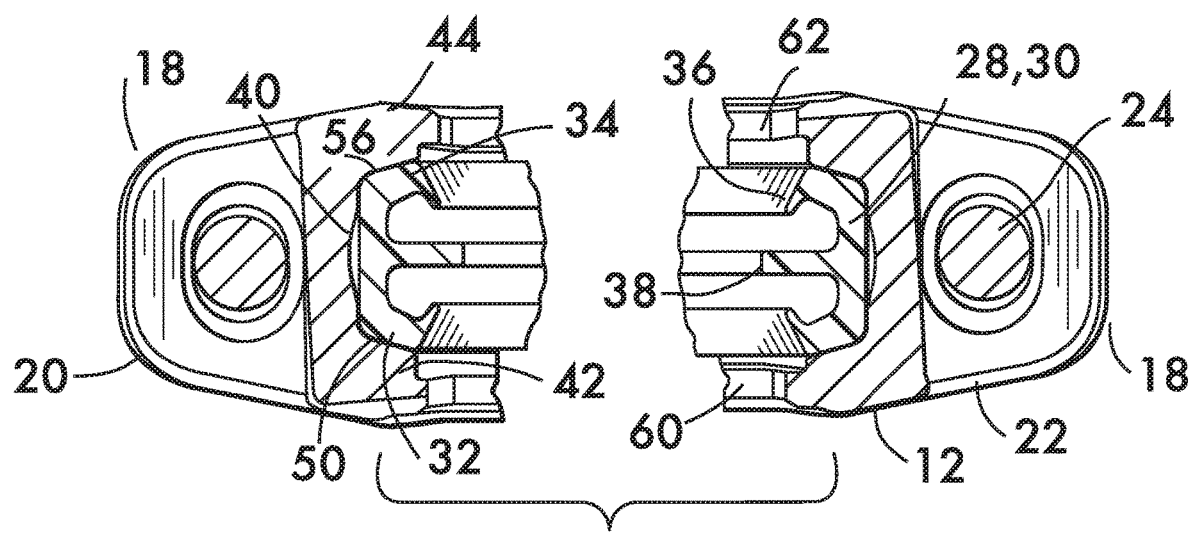
FIG. 3 is a sectional view taken at line 3-3 of FIG. 1.

FIG. 1 shows the coupling 10 in the "preassembled state" wherein the segments 12 and 14 are supported on the seal 28 in spaced apart relation sufficient to permit pipe elements to be inserted into the central space 16 as described below. The fasteners (bolts 24, nuts 26) hold the segments 12 and 14 against the seal 28 in the preassembled state. As shown in FIG. 2, separation of the segments 12 and 14 in the preassembled state is maintained because the first and second cusps 52 and 58 respectively contact the first and second lobes 32 and 34 of the seal 28. Contact between the cusps 52, 58 and the lobes 32, 34 extends circumferentially over a substantial portion of the segments 12 and 14. As shown in FIG. 3, when the coupling 10 is in the preassembled state, portions of the seal 28 adjacent to the attachment members 18 seat within the channel 40, as evinced by deformation of the lobes 32 and 34 toward one another as the first lobe 32 contacts the first surface 50 of the first shoulder 42 and the second lobe 34 contacts the second surface 56 of the second shoulder 44.

Figure 4:
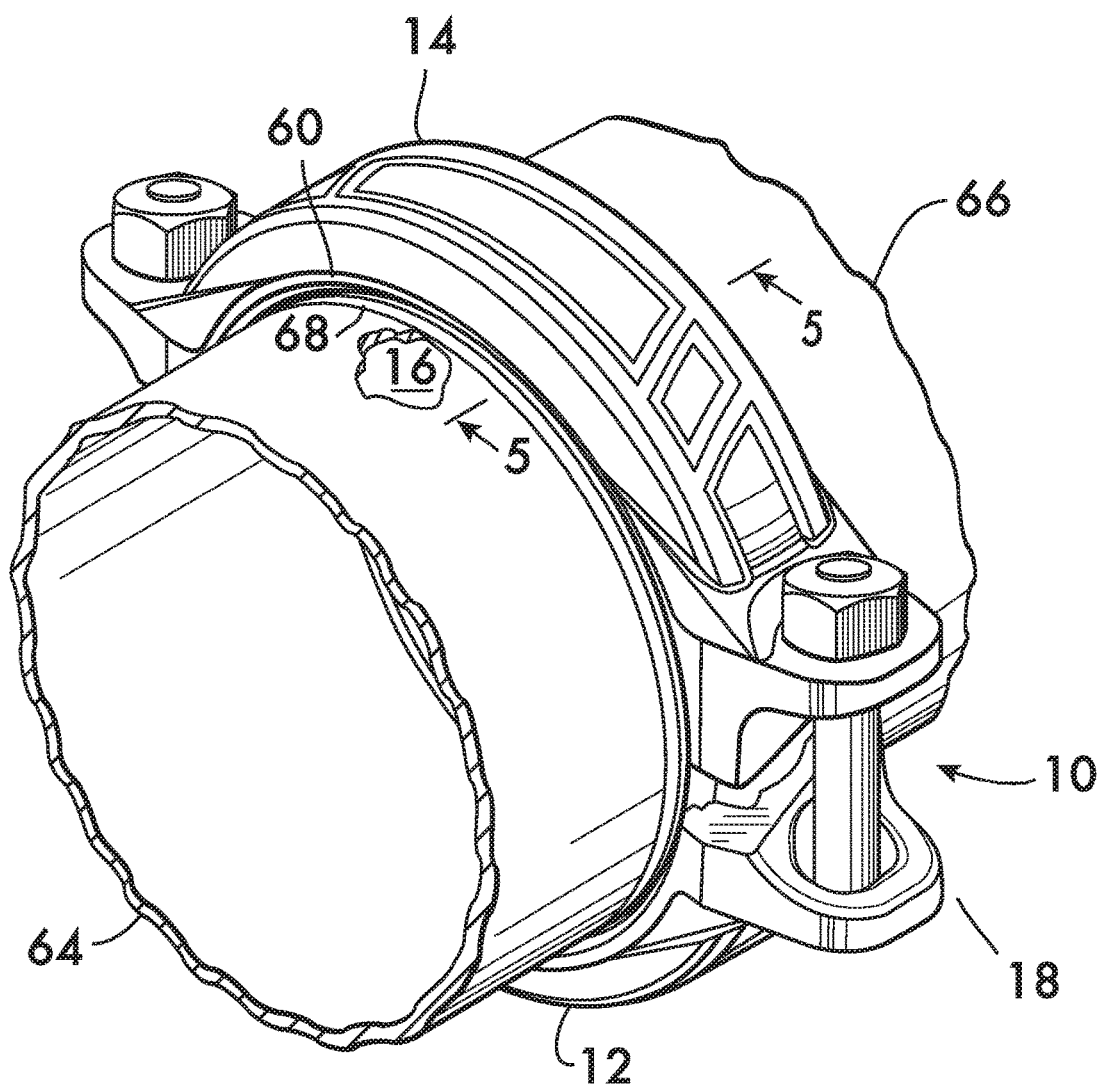
FIG. 4 is an isometric view of the coupling shown in FIG. 1 receiving pipe elements when in its preassembled state.
Figure 5:
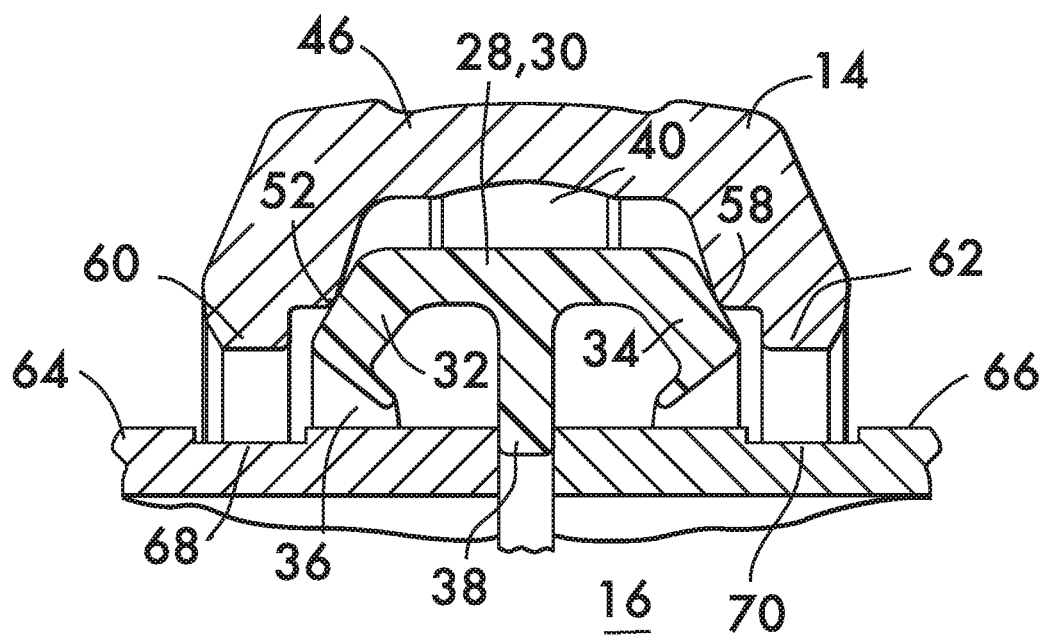
FIG. 5 is a sectional view taken at line 5-5 of FIG. 4.

FIGS. 4-7 illustrate use of the example coupling 10. As shown in FIG. 4, with the coupling 10 in the preassembled state pipe elements 64 and 66 are inserted into the central space 16 defined by the segments 12 and 14. Insertion is possible because the segments 12 and 14 are supported in spaced relation by contact between the cusps 52 and 58 and the lobes 32 and 34 as shown in FIG. 5. The pipe elements are inserted into the central space 16 to the extent that they contact the center leg 38 of the seal 28, which acts as a pipe stop. When the ends of the pipe elements 64 and 66 contact the center leg 38 each arcuate projection 60, 62 aligns with a respective circumferential groove 68, 70 in each pipe element.

Figure 7:
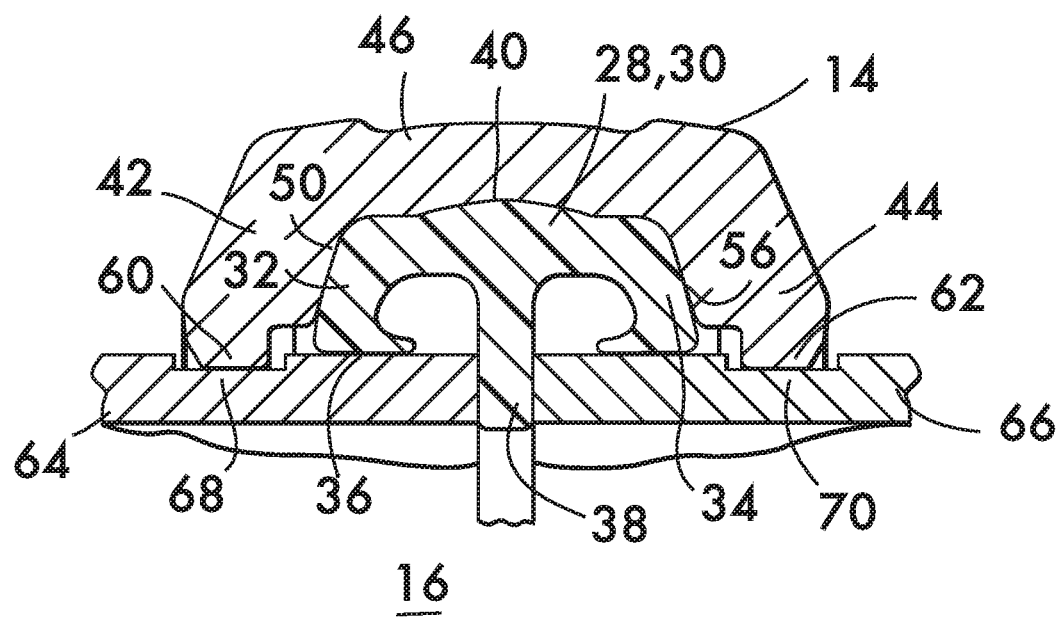
FIG. 7 is a sectional view taken at line 7-7 of FIG. 6.
Figure 6:
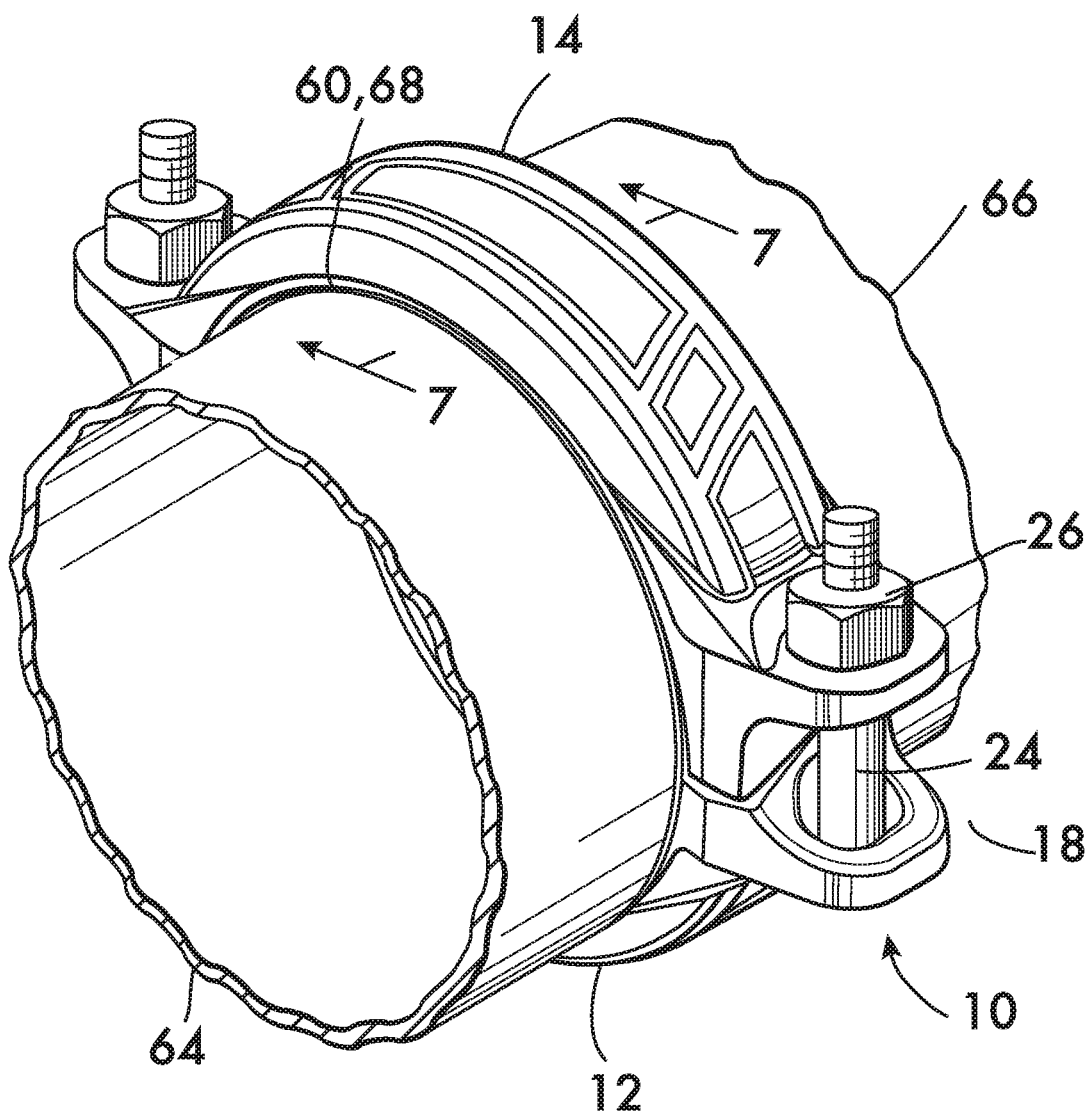
FIG. 6 is an isometric view of the coupling shown in FIG. 1 joining pipe elements.

Next, as shown in FIG. 6, the fasteners (bolts 24, nuts 26) are tightened and the segments 12 and 14 are drawn toward one another. As shown in FIG. 7 the seal 28 is thus compressed between the segments 12 and 14 and the pipe elements 64, 66 and deforms as it seats within channel 40 over the region between the attachment members 18 (see also FIG. 6). As the seal 28 deforms, the sealing surfaces 36 sealingly engage the pipe elements 64 and 66 and the lobes 32 and 34 move toward one another as they contact the second surfaces 50 and 56 of the first and second shoulders 42 and 44. Motion of the lobes 32 and 34 toward one another as the seal 28 seats causes the center leg 38 to retract toward the back surfaces 46 of segments 12 and 14 (14 shown). Retraction of the center leg 38 removes it from the flow path through the pipe elements 64 and 66 and thereby reduces turbulence and consequent head loss. As the segments 12 and 14 are further drawn toward one another the arcuate projections 60 and 62 engage their respective circumferential grooves 68 and 70 to effect a mechanical connection between the coupling 10 and the pipe elements 64 and 66.

Figure 8:
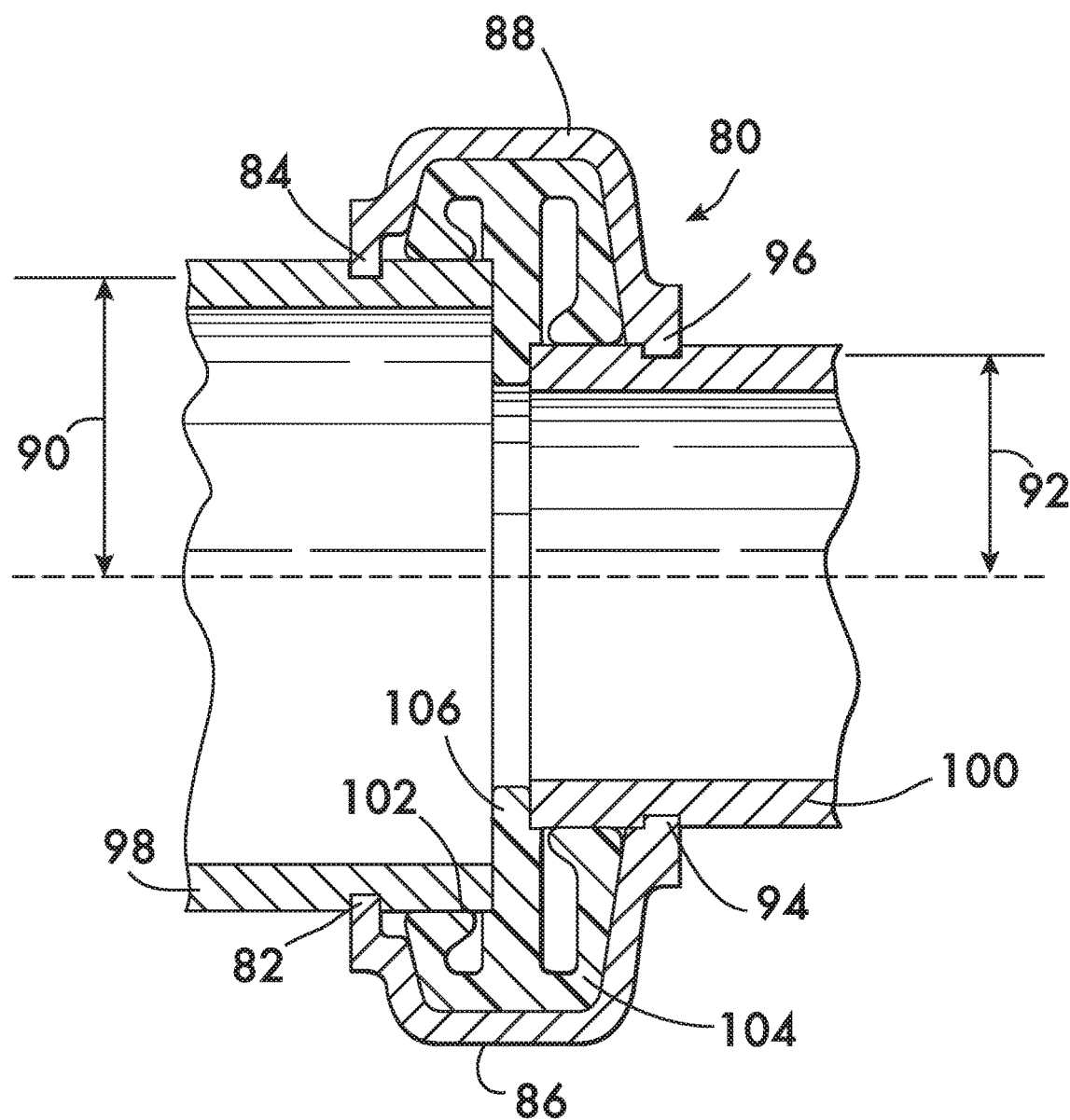
FIG. 8 is a longitudinal sectional view of another embodiment of a coupling according to the invention.

FIG. 8 shows another embodiment of a pipe coupling 80 according to the invention. Coupling 80 differs from the example embodiments described above in that the first arcuate projections on one side of segments 86 and 88 have a greater radius of curvature 90 than the radius of curvature 92 of the second arcuate projections 94 and 96 on the opposite side of segments 86 and 88. Coupling 80 is a "transition" coupling which permits larger diameter pipe elements 98 to be connected to smaller diameter pipe elements 100. FIG. 8 shows the lobes 102 of seal 102 deformed and forming a fluid tight seal between the pipe elements 98 and 100 and the coupling 80. Center leg is shown retracted from the fluid flow path so that it does not cause turbulence and head loss.

Using pipe couplings according to the invention, wherein the segments are supported in spaced relation in the preassembled state on the lobes of the seal, as opposed to the seal's outer circumference, allows a preassembled coupling to be formed with minimized ovality of the ring seal, permits greater separation of the segments for a given ring seal diameter, and retracts the center leg out of the fluid flow path to reduce head loss due to turbulence.

What is claimed is:

1. A method of maintaining first and second segments of a coupling in spaced relation in a preassembled state to permit pipe elements to be inserted into a central space surrounded by said segments when said segments are attached end to end, said method comprising:

positioning a seal within said central space, said seal having first and second lobes positioned on opposite sides thereof;

contacting said first lobe with a cusp of a first shoulder of said first and second segments at first and second points between ends of said first and second segments and contacting said second lobe with a cusp of a second shoulder at first and second points between ends of said first and second segments;

contacting said first lobe with a surface of said first shoulder of said first and second segments at points proximate said ends of said first and second segments and contacting said second lobe with a surface of said second shoulder of said first and second segments at points proximate said ends of said first and second segments.

2. A method of connecting first and second pipe elements to one another using a coupling comprising first and second segments attached to one another end to end surrounding a central space, a seal being positioned between said segments, said seal comprising first and second lobes on opposite sides thereof and a center leg positioned between said lobes, said center leg projecting toward said central space, said method comprising:

supporting said segments in spaced apart relation on said seal by contacting first and second points on said first lobe with first cusps of first shoulders of said first and second segments, said first and second points on said first lobe being between ends of said first and second segments, and by contacting first and second points on said second lobe with second cusps of second shoulders of said first and second segments, said first and second points on said second lobe being between ends of said first and second segments;

inserting said pipe elements into said central space, said center leg being between said pipe elements;

drawing said first and second segments toward one another and thereby deforming said seal such that said center leg is retracted in a direction away from said central space.

* * * * *